United States Patent
Park

(10) Patent No.: US 10,926,623 B1
(45) Date of Patent: Feb. 23, 2021

(54) HYBRID POWERTRAIN FOR VEHICLES

(71) Applicants: Hyundai Motor Company, Seoul (KR); Kia Motors Corporation, Seoul (KR)

(72) Inventor: Jong Yun Park, Hwaseong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/898,115

(22) Filed: Jun. 10, 2020

(30) Foreign Application Priority Data

Feb. 25, 2020 (KR) ........................ 10-2020-0022647

(51) Int. Cl.
| | |
|---|---|
| *B60K 6/365* | (2007.10) |
| *B60K 6/54* | (2007.10) |
| *B60K 17/16* | (2006.01) |
| *B60K 6/26* | (2007.10) |
| *B60K 6/38* | (2007.10) |
| *B60K 6/48* | (2007.10) |
| *F16H 37/08* | (2006.01) |
| *F16H 3/72* | (2006.01) |
| *F16H 63/30* | (2006.01) |
| *F16H 37/04* | (2006.01) |

(52) U.S. Cl.
CPC .................. *B60K 6/54* (2013.01); *B60K 6/26* (2013.01); *B60K 6/365* (2013.01); *B60K 6/38* (2013.01); *B60K 6/48* (2013.01); *B60K 17/16* (2013.01); *F16H 3/724* (2013.01); *F16H 37/046* (2013.01); *F16H 37/0806* (2013.01); *F16H 63/30* (2013.01); *B60K 2006/4808* (2013.01); *B60K 2006/4825* (2013.01); *B60K 2006/4841* (2013.01); *F16H 2063/3093* (2013.01)

(58) Field of Classification Search
CPC ............ F16H 3/724; B60K 6/365; B60K 6/54
See application file for complete search history.

(56) References Cited

U.S. PATENT DOCUMENTS

| | | | |
|---|---|---|---|
| 2016/0091055 A1* | 3/2016 | Kim ........................ | B60K 6/547 74/661 |
| 2019/0225068 A1* | 7/2019 | Liu .......................... | B60K 6/36 |

FOREIGN PATENT DOCUMENTS

KR  10-2015-0069194 A  6/2015

* cited by examiner

*Primary Examiner* — Derek D Knight
(74) *Attorney, Agent, or Firm* — Morgan, Lewis & Bockius LLP

(57) ABSTRACT

A hybrid powertrain may include an engine input shaft connected to an engine by a main clutch, a motor input shaft connected to a motor, first and second output shafts mounted in parallel to the engine input shaft, a variable driving gear provided on the motor input shaft to maintain or increase a rotation speed of the motor input shaft and then to transmit the maintained or increased rotation speed to the first output shaft, a composite synchronizer mounted to independently implement interruption of connection between the engine input shaft and the motor input shaft and interruption of connection between the variable driving gear and the motor input shaft, and plural gear pairs mounted to form different transmission gear ratios between the engine input shaft and the first output shaft and between the engine input shaft and the second output shaft.

12 Claims, 8 Drawing Sheets

HYBRID POWERTRAIN FOR VEHICLES

CROSS-REFERENCE TO RELATED APPLICATION

The present application claims priority to Korean Patent Application No. 10-2020-0022647, filed Feb. 25, 2020, the entire contents of which is incorporated herein for all purposes by this reference.

BACKGROUND OF THE INVENTION

Field of the Invention

The present invention relates to a layout of a hybrid powertrain which is applicable to a vehicle.

Description of Related Art

An automated manual transmission (AMT) is generally considered as the most competitive transmission among automated transmissions in terms of production cost, material costs and fuel efficiency, but lowers the marketability of a vehicle due to torque interruption occurring during shifting, and therefore has not been widely adopted.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid powertrain which may improve shift feeling by eliminating torque interruption, which is a disadvantage of an automated manual transmission (AMT), using a motor, while reinforcing the advantages of the AMT, and obviate a clutch between the motor and an engine, required by a conventional hybrid powertrain in which the motor is located between the engine and a transmission, to improve ease of mounting of a transmission in a vehicle due to a reduction in the overall length of the transmission, to reduce the weight and production cost of the transmission, and to contribute to improvement in fuel efficiency of the vehicle.

In accordance with various aspects of the present invention, the above and other objects may be accomplished by the provision of a hybrid powertrain for vehicles including an engine input shaft connected to an engine by a main clutch, a motor input shaft mounted to be coaxial with the engine input shaft and connected to a motor, a first output shaft and a second output shaft each mounted in parallel to the engine input shaft, a variable driving gear provided on the motor input shaft to maintain or increase a rotation speed of the motor input shaft and then to transmit the maintained or increased rotation speed to the first output shaft, a composite synchronizer mounted to independently implement interruption of connection between the engine input shaft and the motor input shaft and interruption of connection between the variable driving gear and the motor input shaft, and a plurality of external gear pairs mounted to form different transmission gear ratios between the engine input shaft and the first output shaft and between the engine input shaft and the second output shaft, wherein a plurality of transmission gear ratios, formed by the plurality of external gear pairs, and two transmission gear ratios, formed when the variable driving gear transmits power to the first output shaft, form a series of transmission gear ratios used to drive a vehicle.

The composite synchronizer may include a hub fixed to the motor input shaft, and a first sleeve and a second sleeve mounted to be independently slidable on the hub in an axial direction thereof.

The variable driving gear may have a clutch gear provided integrally therewith to be engaged with the second sleeve of the composite synchronizer, and be integrally connected to a third rotation element of a planetary gear set including a first rotation element provided to be selectively connectable to a transmission housing by a brake and a second rotation element fixed to the motor input shaft.

The first sleeve of the composite synchronizer may form a synchronization device connectable to the engine input shaft through synchronous interaction using a synchronizer ring due to axial movement of the first sleeve, and the second sleeve of the composite synchronizer and the clutch gear of the variable driving gear may form a dog clutch.

The external gear pairs between the engine input shaft and the first output shaft may be mounted to implement a transmission gear ratio of a second speed and a transmission gear ratio of a sixth speed, the external gear pairs between the engine input shaft and the second output shaft may be mounted to implement a transmission gear ratio of a first speed and a transmission gear ratio of a fourth speed, and the variable driving gear may be mounted to transmit power to the first output shaft at a transmission gear ratio of a third speed and a transmission gear ratio of a fifth speed.

A first driving gear used to implement the transmission gear ratio of the first speed and the transmission gear ratio of the second speed in common and a second driving gear used to implement the transmission gear ratio of the fourth speed and the transmission gear ratio of the sixth speed in common may be mounted on the engine input shaft, a driven gear for the second speed engaged with the first driving gear and a driven gear for the sixth speed engaged with the second driving gear may be mounted on the first output shaft, and a driven gear for the first speed engaged with the first driving gear and a driven gear for the fourth speed engaged with the second driving gear may be mounted on the second output shaft.

The first driving gear and the second driving gear may be mounted on the engine input shaft such that rotation thereof is locked onto the engine input shaft, a second and sixth speed synchronization device configured to selectively lock rotation of the driven gear for the second speed and the driven gear for the sixth speed onto the first output shaft may be provided on the first output shaft, and a first and fourth speed synchronization device configured to selectively lock rotation of the driven gear for the first speed and the driven gear for the fourth speed onto the second output shaft may be provided on the second output shaft.

The clutch gear engaged with the first sleeve of the composite synchronizer may be integrally provided on the second driving gear.

A first output gear may be provided on the first output shaft, a second output gear may be provided on the second output shaft, and the first output gear and the second output gear may be in common engaged with a ring gear of a differential device.

A motor driven gear configured to receive power from the motor may be provided integrally with the motor input shaft, and a motor driving gear provided on a rotation shaft of the motor may be engaged with the motor driven gear.

The methods and apparatuses of the present invention have other features and advantages which will be apparent from or are set forth in more detail in the accompanying drawings, which are incorporated herein, and the following Detailed Description, which together are configured to explain certain principles of the present invention.

Figure 1:
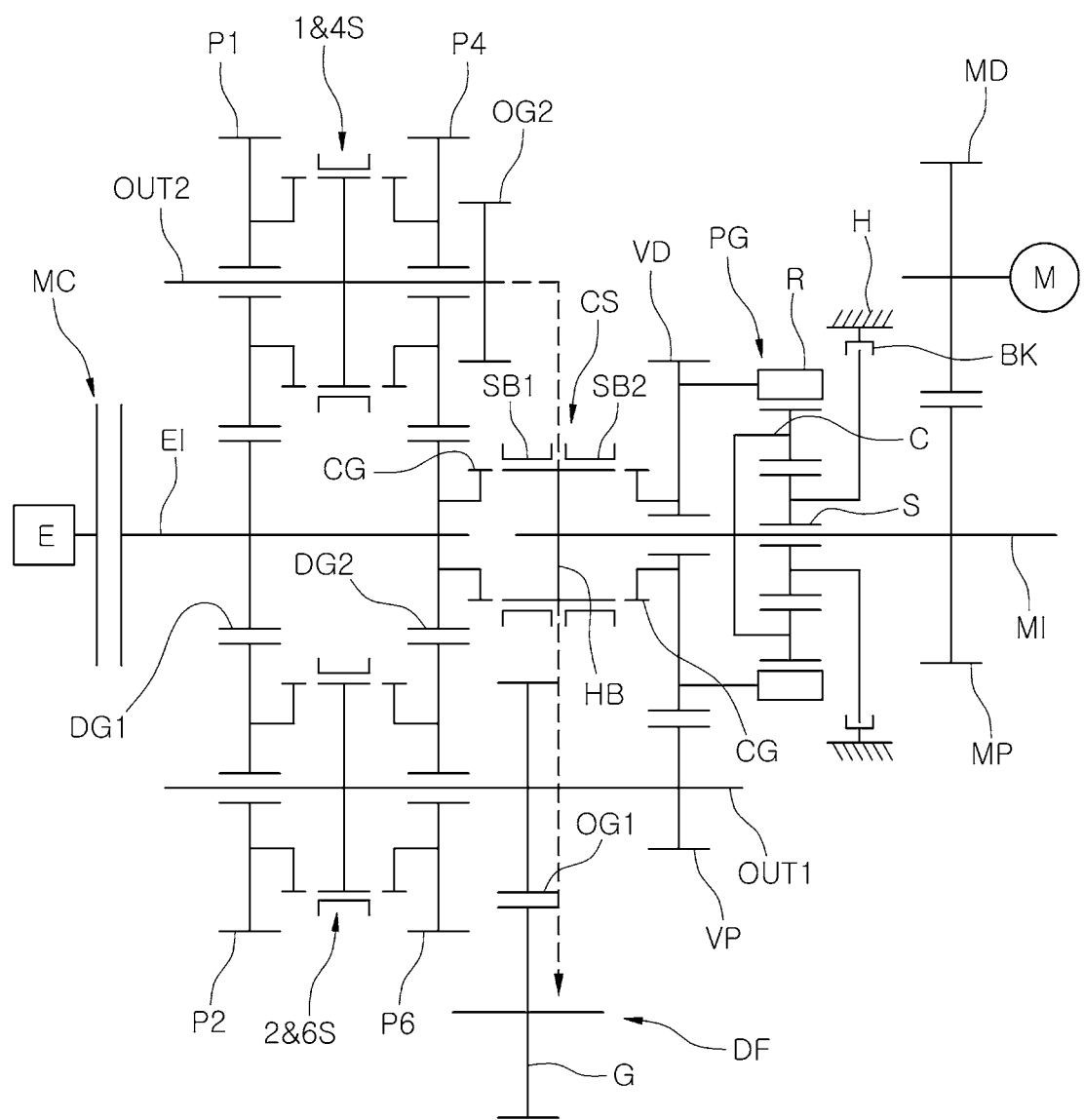
FIG. 1 is a diagram illustrating a hybrid powertrain for vehicles according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments of the present invention, examples of which are illustrated in the accompanying drawings. Wherever possible, the same reference numbers will be used throughout the drawings to refer to the same or like parts.

Referring to FIG. 1, a hybrid powertrain for vehicles according to an exemplary embodiment of the present invention includes an engine input shaft EI which is connected to an engine E by a main clutch MC, a motor input shaft MI which is mounted to be coaxial with the engine input shaft EI and is connected to a motor M, a first output shaft OUT1 and a second output shaft OUT2 which are mounted in parallel to the engine input shaft EI, a variable driving gear VD which is provided on the motor input shaft MI to maintain or increase the rotation speed of the motor input shaft MI and then to transmit the maintained or increased rotation speed to the first output shaft OUT1, a composite synchronizer CS which is mounted to independently implement interruption of connection between the engine input shaft EI and the motor input shaft MI and interruption of connection between the variable driving gear VD and the motor input shaft MI, and a plurality of external gear pairs which is mounted to form different transmission gear ratios between the engine input shaft EI and the first output shaft OUT1 and between the engine input shaft EI and the second output shaft OUT2.

A plurality of transmission gear ratios, which is formed by the plurality of external gear pairs, and two transmission gear ratios, which is formed when the variable driving gear VD transmits power to the first output shaft OUT1, form a series of transmission gear ratios used to drive a vehicle.

That is, in the exemplary embodiment of the present invention, the plurality of external gear pairs is provided to form transmission gear ratios of first, second, fourth and sixth forward speeds, the variable driving gear VD forms a transmission gear ratio of a third speed, when the variable driving gear VD maintains the rotation speed of the motor input shaft MI and then transmits the maintained rotating speed, and forms a transmission gear ratio of a fifth speed, when the variable driving gear VD increases the rotation speed of the motor input shaft MI and then transmits the increased rotating speed, and thereby, the vehicle may implement a series of transmission gear ratios, i.e., the transmission gear ratios of the first to sixth speeds.

The powertrain according to an exemplary embodiment of the present invention may implement first to sixth speeds through the plurality of external gear pairs and the variable driving gear VD using power of the engine E which the engine input shaft EI receives through the main clutch MC, and perform smooth shifting without torque interruption caused by shifting, as will be described later.

The composite synchronizer CS includes a hub HB which is mounted on the motor input shaft MI, and a first sleeve SB1 and a second sleeve SB2 which are mounted to be independently slidable on the hub HB in an axial direction thereof.

Here, the "axial direction" means the longitudinal direction of the motor input shaft MI.

The variable driving gear VD has a clutch gear CG which is provided integrally therewith to be engaged with the second sleeve SB2 of the composite synchronizer CS, and is integrally connected to a third rotation element of a planetary gear set PG including a first rotation element which is provided to be fixable to a transmission housing H by a brake BK, and a second rotation element which is connected to the motor input shaft MI.

Here, the first rotation element of the planetary gear set PG is a sun gear S, the second rotation element is a planet carrier, and the third rotation element is a ring gear R.

That is, the composite synchronizer CS connects the variable driving gear VD to the motor input shaft MI by engaging the second sleeve SB2 with the clutch gear CG of the variable driving gear VD, and the variable driving gear VD transmits the power of the motor input shaft MI to the first output shaft OUT1 under the condition that the brake BK is not engaged. Here, since the planetary gear set PG is in the state in which the ring gear R and the planet carrier C are connected, all of the rotation elements are rotated with the variable driving gear VD at the same speed as the motor input shaft MI.

Furthermore, when the second sleeve SB2 is released from the clutch gear CG of the variable driving gear VD and the brake BK is engaged, the power of the motor input shaft MI is input to the planet carrier C of the planetary gear set PG and is accelerated by the ring gear R, and thus, the variable driving gear VD, which is directly connected to the ring gear R transmits the accelerated power of the motor input shaft MI to the first output shaft OUT1.

The first sleeve SB1 of the composite synchronizer CS forms a synchronization device which may be connected to the engine input shaft EI through synchronous interaction using a synchronizer ring due to the axial movement of the first sleeve SB1, and the second sleeve SB2 of the composite synchronizer CS and the clutch gear CG of the variable driving gear VD form a dog clutch.

In the exemplary embodiment of the present invention, the clutch gear CG, forming a portion of the composite synchronizer CS, is provided integrally with a second driving gear DG2, which will be described later, on the engine input shaft EI, and is configured to directly connect the engine input shaft EI to the motor input shaft MI by engaging the first sleeve SB1 with the clutch gear CG.

Furthermore, the synchronizer ring is provided between the clutch gear CG of the second driving gear DG2 and the first sleeve SB1, and the first sleeve SB1 is engaged with the clutch gear CG of the second driving gear DG2 by synchronous interaction of the synchromesh-type synchronization device.

For reference, the synchronizer ring is used in conventional synchromesh-type synchronization devices, and an illustration thereof will thus be omitted from the drawings.

As described above, the second sleeve SB2 of the composite synchronizer CS and the clutch gear CG of the variable driving gear VD form the dog clutch, and the reason for this is to actively perform synchronous interaction by the motor M and the brake BK.

The external gear pairs between the engine input shaft EI and the first output shaft OUT1 are mounted to implement the transmission gear ratio of the second speed and the transmission gear ratio of the sixth speed, the external gear pairs between the engine input shaft EI and the second output shaft OUT2 are mounted to implement the transmission gear ratio of the first speed and the transmission gear ratio of the fourth speed, and the driving gear VD is mounted to transmit power to the first output shaft OUP1 at the transmission gear ratio of the third speed and the transmission gear ratio of the fifth speed.

That is, a first driving gear DG1, which is used to implement the transmission gear ratio of the first speed and the transmission gear ratio of the second speed in common, and the second driving gear DG2, which is used to implement the transmission gear ratio of the fourth speed and the transmission gear ratio of the sixth speed in common, are mounted on the engine input shaft EI, a driven gear P2 for the second speed, which is engaged with the first driving gear DG1, and a driven gear P6 for the sixth speed, which is engaged with the second driving gear DG2, are mounted on the first output shaft OUT1, and a driven gear P1 for the first speed, which is engaged with the first driving gear DG1, and a driven gear P4 for the fourth speed, which is engaged with the second driving gear DG2, are mounted on the second output shaft OUT2.

The first driving gear DG1 and the second driving gear DG2 are mounted on the engine input shaft EI such that rotation thereof is locked onto the engine input shaft EI, a second and sixth speed synchronization device 2&6S configured to selectively lock rotation of the driven gear P2 for the second speed and the driven gear P6 for the sixth speed onto the first output shaft OUT1 is provided on the first output shaft OUT1, and a first and fourth speed synchronization device 1&4S configured to selectively lock rotation of the driven gear P1 for the first speed and the driven gear P4 for the fourth speed onto the second output shaft OUT2 is provided on the second output shaft OUT2.

Furthermore, a first output gear OG1 is provided on the first output shaft OUT1, a second output gear OG2 is provided on the second output shaft OUT2, and the first output gear OG1 and the second output gear OG2 are in common engaged with a gear G of a differential device DF to output power to driving wheels.

Furthermore, a variable driven gear VP, which is engaged with the variable driving gear VD, is mounted on the first output shaft OUT1 such that rotation of the variable driven gear VP is locked onto the first output shaft OUT1, being configured for transmitting power from the variable driving gear VD to the first output shaft OUT1.

A motor driven gear MP for receiving power from the motor M is provided integrally with the motor input shaft MI1, and a motor driving gear MD provided on a rotation shaft of the motor M is engaged with the motor driven gear MP.

Therefore, the rotation speed of the motor M is changed by a gear ratio of the motor driving gear MD to the motor driven gear MP, and is then transmitted to the motor input shaft MI.

Furthermore, the motor M may be directly connected to the motor input shaft M1, or be configured to transmit the power of the motor M, which is reduced to a designated speed by a separate reducer provided between the motor M and the motor input shaft MI, for example, a planetary gear set including a ring gear which is fixed, a sun gear which is connected to the motor, and a planet carrier which is connected to the motor input shaft MI.

Hereinafter, a process of shifting the first speed to the sixth speed in the powertrain shown in FIG. 1 according to an exemplary embodiment will be described.

Figure 2A:
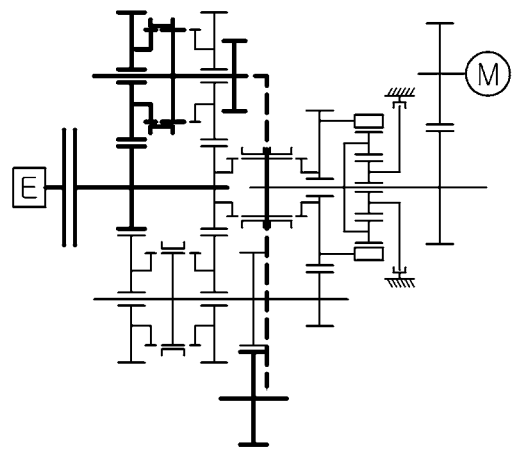
FIG. 2A, FIG. 2B, FIG. 2C, FIG. 2D and FIG. 2E are diagrams illustrating a process of shifting from a first speed to a second speed in the powertrain of FIG. 1.

FIG. 2A, FIG. 2B, FIG. 2C, FIG. 2D and FIG. 2E are diagrams illustrating a process of shifting from the first speed to the second speed. FIG. 2A illustrates a driving state of the vehicle in the first speed, in which the main clutch MC is engaged, the first and fourth speed synchronization device 1&4S connects the driven gear P1 for the first speed to the second output shaft OUT2, the composite synchronizer CS disconnects the engine input shaft EI and the motor input shaft MI from each other, and the power of the engine E drives the engine input shaft EI through the main clutch MC.

Here, the power of the engine input shaft EI is transmitted to the second output shaft OUT2 through the first driving gear DG1 and the driven gear P1 for the first speed, and is then output while forming the transmission gear ratio of the first speed through the second output gear OG2 and the gear G of the differential device DF.

Furthermore, the second sleeve SB2 of the composite synchronizer CS may be engaged in advance with the clutch gear CG of the variable driving gear VD, as shown in FIG. 2A.

Figure 2B:
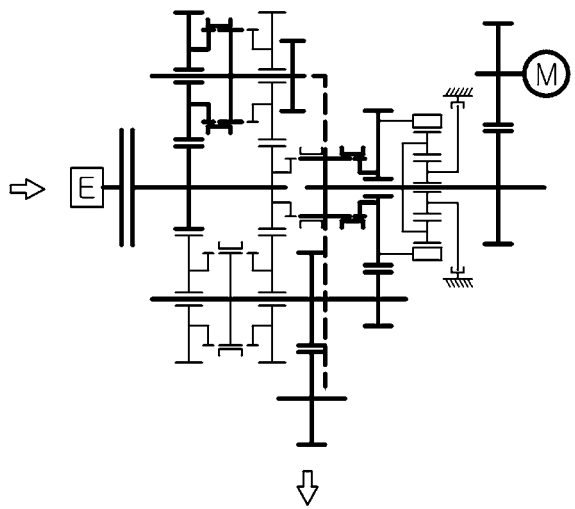

When a command for instructing to shifting to the second speed is given, both of power from the engine E and power from the motor are transmitted to the gear G of the differential device DF by driving the motor M, as shown in FIG. 2B.

Figure 2C:
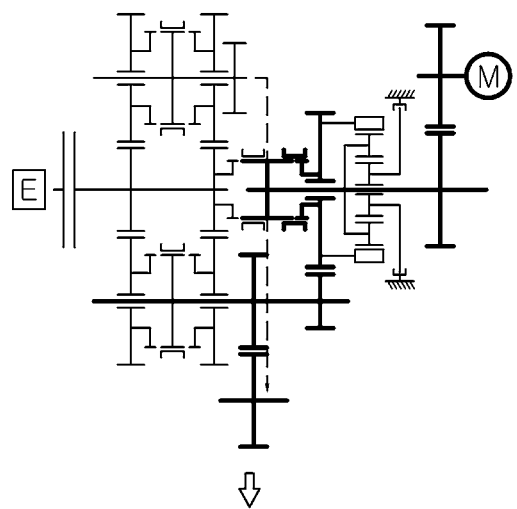

The main clutch MC is released, and the current driving state of the vehicle is maintained using the power of the motor M, as shown in FIG. 2C.

Figure 2E:
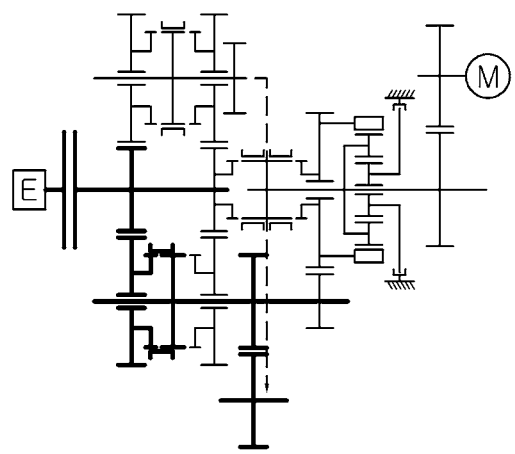
Figure 2D:
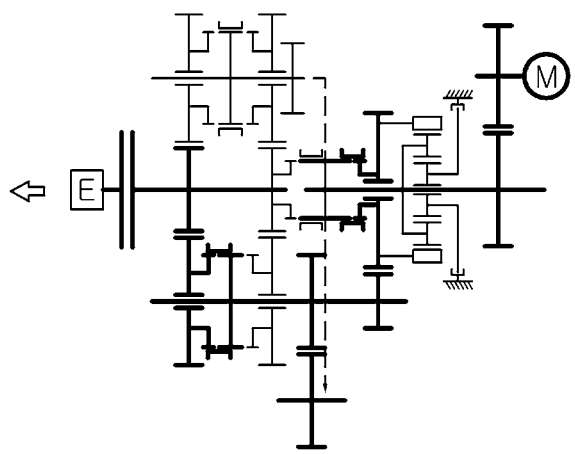

In the state in which the driven gear P2 for the second speed is locked onto the first output shaft OUT1 by the second and sixth speed synchronization device 2&6S, driving of the vehicle in the second speed is initiated by engaging the main clutch MC, as shown in FIG. 2D, and the vehicle enters a driving state in the second speed using only the engine E by releasing driving of the motor M, as shown in FIG. 2E.

Therefore, shifting is completed without torque interruption.

Figure 3A:
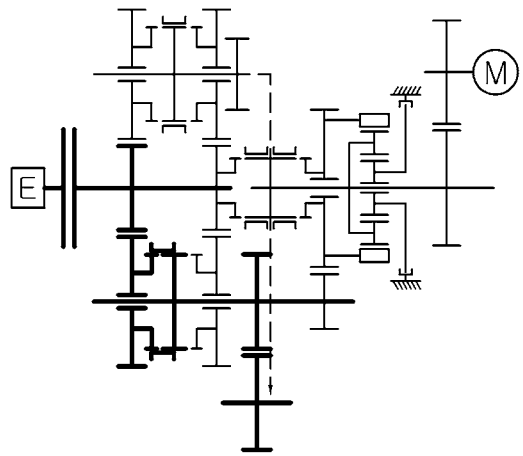
FIG. 3A, FIG. 3B, FIG. 3C, FIG. 3D and FIG. 3E are diagrams illustrating a process of shifting from the second speed to a third speed in the powertrain of FIG. 1.

FIG. 3A, FIG. 3B, FIG. 3C, FIG. 3D and FIG. 3E are diagrams illustrating a process of shifting from the second speed to the third speed. FIG. 3A illustrates the same state as FIG. 2E, i.e., the driving state of the vehicle in the second speed.

Figure 3B:
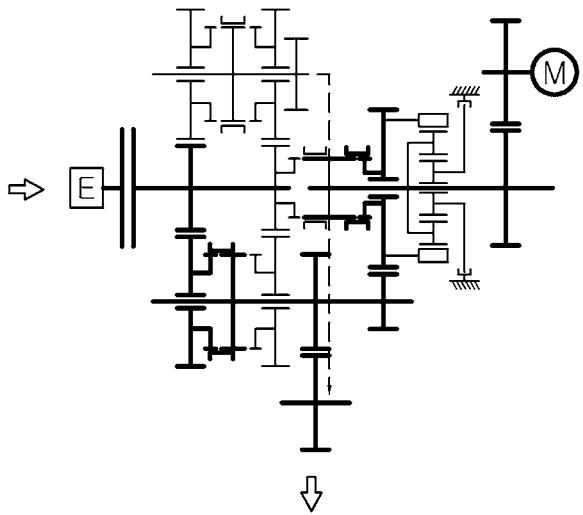

When a command for instructing to shifting to the third speed is given, the motor M is driven to prepare for cutoff of power from the engine E, as shown in FIG. 3B.

Figure 3C:
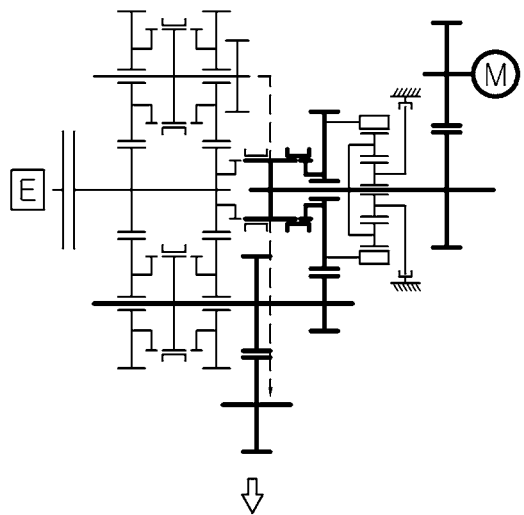

The main clutch MC is released, and the driving state of the vehicle in the second speed is maintained using only the power of the motor M, as shown in FIG. 3C.

Figure 3E:
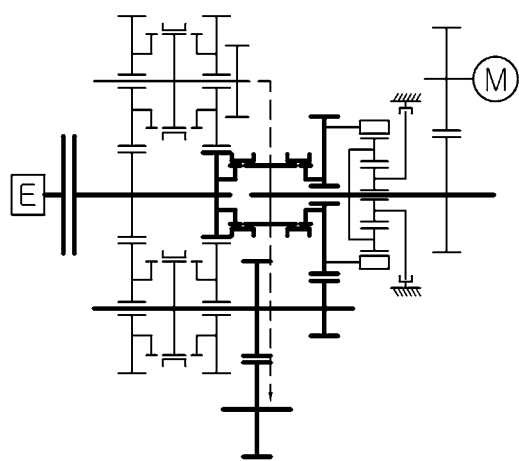
Figure 3D:
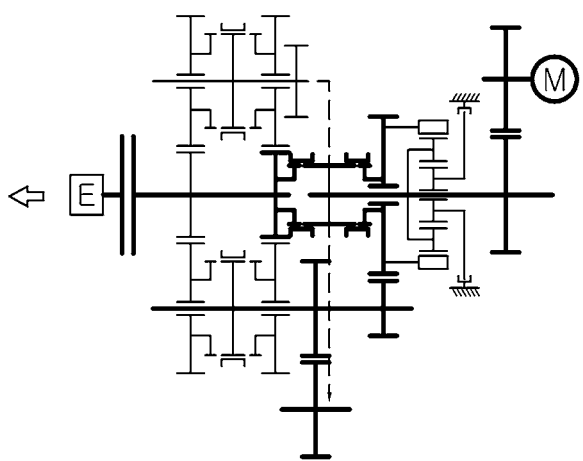

When the first sleeve SB1 of the composite synchronizer CS is moved to the left so that the engine input shaft EI and the motor input shaft MI are directly connected to each other and then the main clutch MC is engaged, the vehicle enters a driving state in the third speed, as shown in FIG. 3D, and when driving of the motor M is released, the driving state of the vehicle in the third speed is maintained using only the engine E, as shown in FIG. 3E. During the present shifting process, torque interruption does not occur.

Figure 4A:
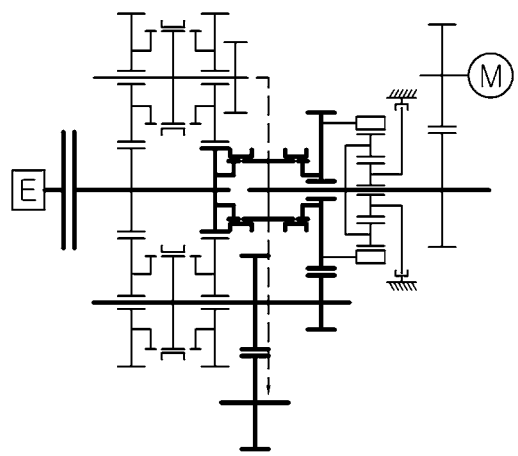
FIG. 4A, FIG. 4B, FIG. 4C, FIG. 4D and FIG. 4E are diagrams illustrating a process of shifting from the third speed to a fourth speed in the powertrain of FIG. 1.

FIG. 4A, FIG. 4B, FIG. 4C, FIG. 4D and FIG. 4E are diagrams illustrating a process of shifting from the third speed to the fourth speed. FIG. 4A illustrates the same state as FIG. 3E.

Figure 4B:
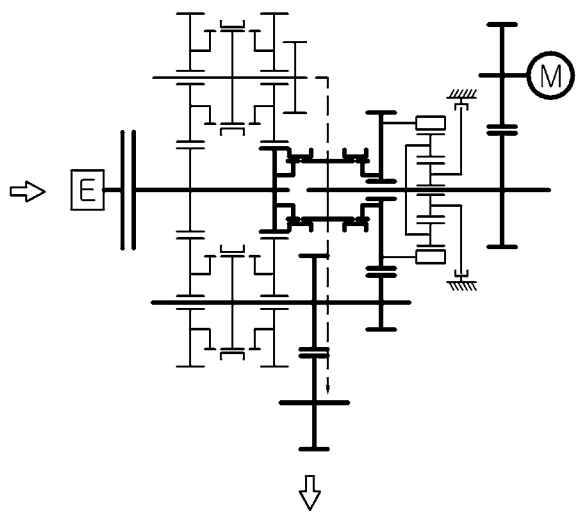
Figure 4C:
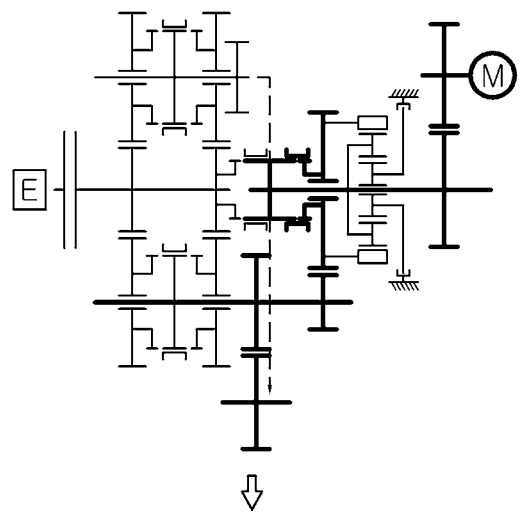
Figure 4E:
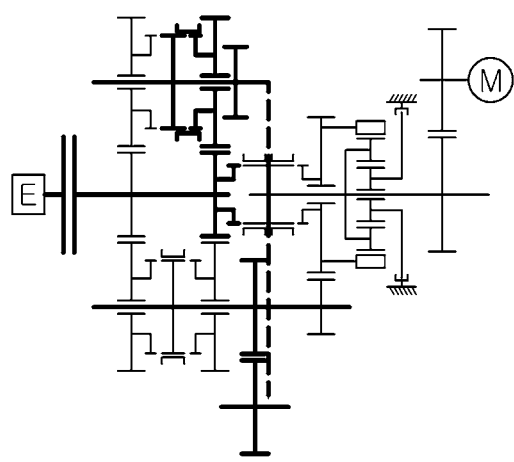
Figure 4D:
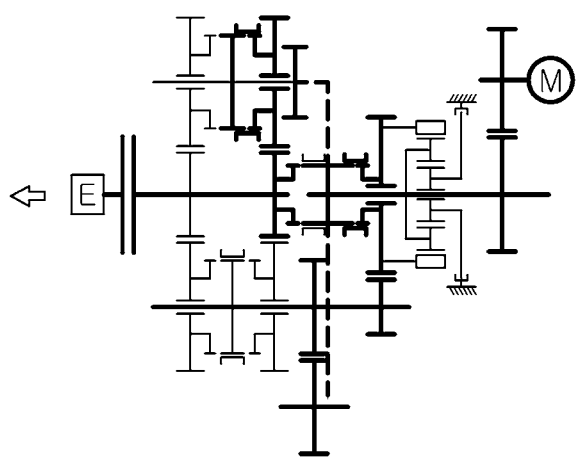

When a command for instructing to shifting to the fourth speed is given, driving of the motor M is initiated, as shown in FIG. 4B, the first sleeve SB1 of the composite synchronizer CS and the main clutch MC are released and the first and fourth speed synchronization device 1&4S connects the driven gear P4 for the fourth speed to the second output shaft OUT2, as shown in FIG. 4C, the vehicle enters a driving state in the fourth speed by engaging the main clutch MC, as shown in FIG. 4D, and then the driving state of the vehicle in the fourth speed is maintained using only the engine E by releasing driving of the motor M, as shown in FIG. 4E. Also, during the present shifting process, torque interruption does not occur.

Figure 5A:
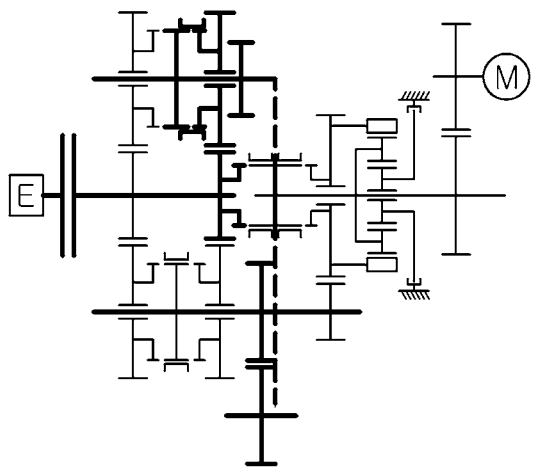
FIG. 5A, FIG. 5B, FIG. 5C, FIG. 5D and FIG. 5E are diagrams illustrating a process of shifting from the fourth speed to a fifth speed in the powertrain of FIG. 1.

FIG. 5A, FIG. 5B, FIG. 5C, FIG. 5D and FIG. 5E are diagrams illustrating a process of shifting from the fourth speed to the fifth speed. FIG. 5A illustrates a state in which the second sleeve SB2 of the composite synchronizer CS is released from the clutch gear CG of the variable driving gear VD in the driving state of the vehicle in the fourth speed shown in FIG. 4E.

Figure 5B:
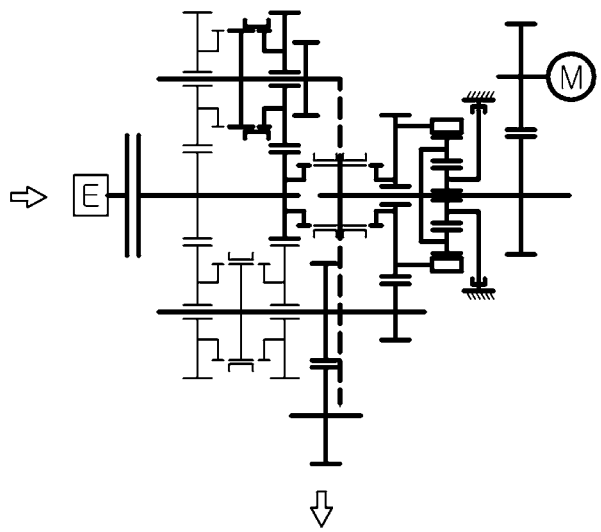

When a command for instructing to shifting to the fifth speed is given, the motor M is driven while engaging the brake BK, and thus the driving state of the vehicle in the fourth speed is maintained additionally using the motor M, as shown in FIG. 5B.

Here, since the rotation speed of the motor M is increased by the planetary gear set PG and the variable driving gear VD and then the power of the motor M having the increased rotation speed is transmitted to the first output shaft OUT1, the motor M does not need to increase the RPM thereof while implementing driving of the vehicle in the fourth speed.

Figure 5C:
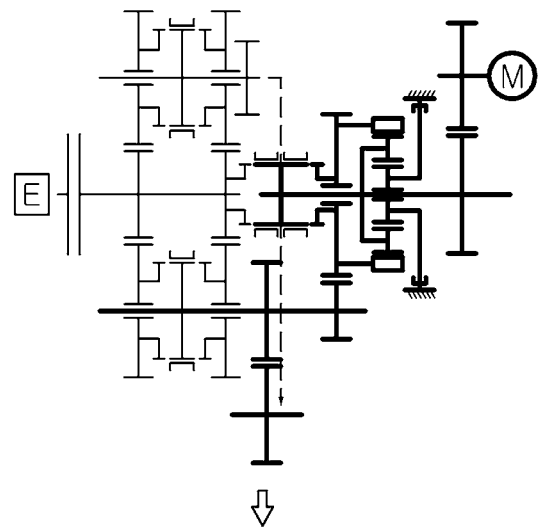

The main clutch MC is released, and the first and fourth speed synchronization device 1&4S is released into a neutral condition, as shown in FIG. 5C.

Figure 5E:
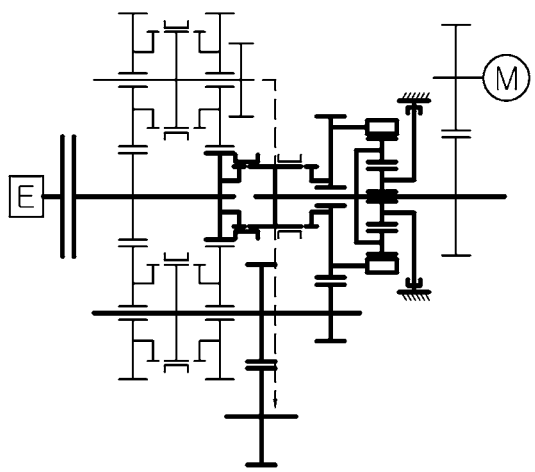
Figure 5D:
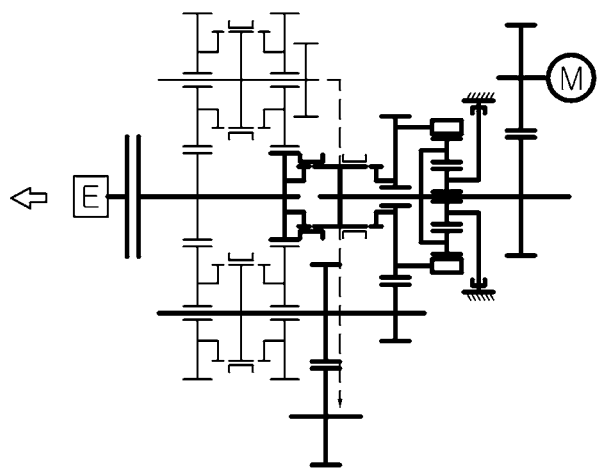

The motor input shaft MI is directly connected to the engine input shaft EI by the first sleeve SB1 of the composite synchronizer CS, and then the main clutch MC is engaged so that the vehicle enters a driving state in the fifth speed, as shown in FIG. 5D, and then the driving state of the vehicle in the fifth speed is maintained using only the engine E by releasing driving of the motor M, as shown in FIG. 5E. Also, during the present shifting process, torque interruption does not occur.

Figure 6A:
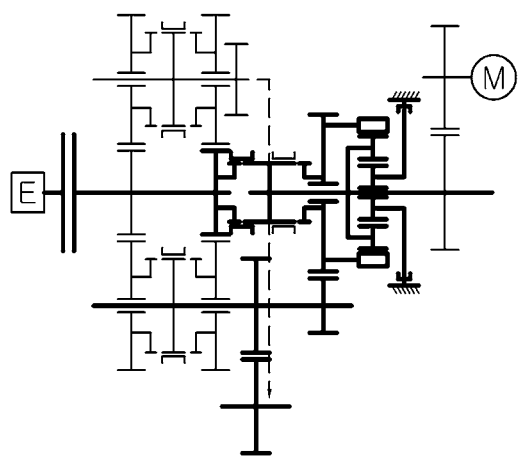
FIG. 6A, FIG. 6B, FIG. 6C, FIG. 6D and FIG. 6E are diagrams illustrating a process of shifting from the fifth speed to a sixth speed in the powertrain of FIG. 1.
Figure 6B:
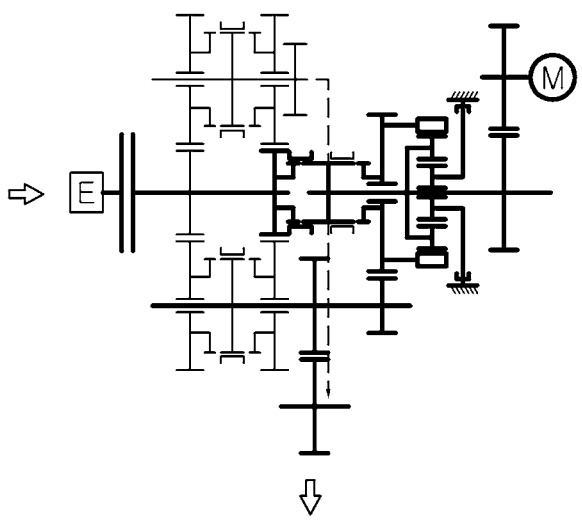
Figure 6C:
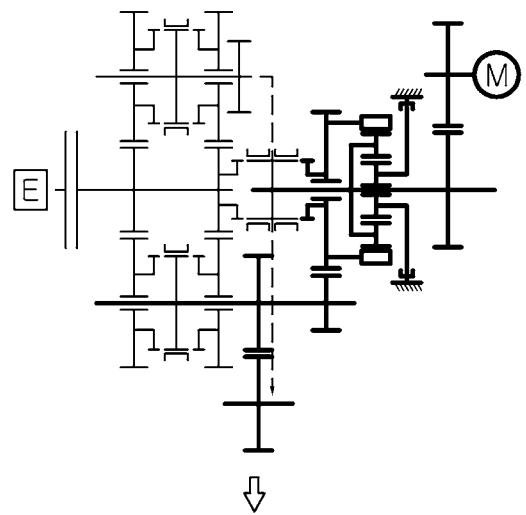

FIG. 6A, FIG. 6B, FIG. 6C, FIG. 6D and FIG. 6E are diagrams illustrating a process of shifting from the fifth speed to the sixth speed. In the driving state of the vehicle in the fifth speed, as shown in FIG. 6A, when a command for instructing to shifting to the sixth speed is given, the motor M is driven and thus the driving state of the vehicle in the fifth speed is maintained additionally using the motor M, as shown in FIG. 6B, and then the main clutch MC is released and the first sleeve SB1 of the composite synchronizer CS is released into a neutral condition, as shown in FIG. 6C.

Figure 6E:
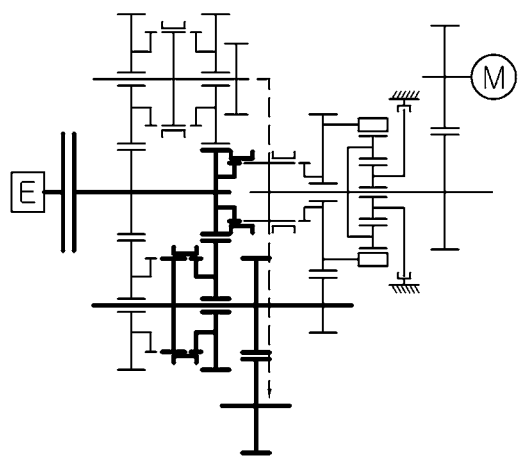
Figure 6D:
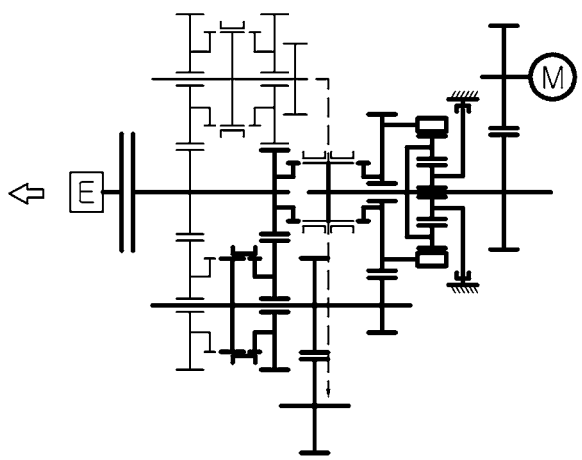

The second and sixth speed synchronization device 2&6S is engaged with the driven gear P6 for the sixth speed, and then the vehicle enters a driving state in the sixth speed by engaging the main clutch MC, as shown in FIG. 6D.

Thereafter, when driving of the motor M is released, the driving state of the vehicle in the sixth speed is maintained using only the engine E, as shown in FIG. 6E. Also, during the present shifting process, torque interruption does not occur.

That is, the hybrid powertrain according to an exemplary embodiment of the present invention may perform shifting from the first through sixth speeds without torque interruption, being configured for realizing excellent power transmission efficiency and shifting quality.

For reference, in the drawings, bold lines indicate portions to which power is transmitted, and downshifting is performed through a process similar to the above-described upshifting process and a detailed description thereof will thus be omitted.

Figure 7A:
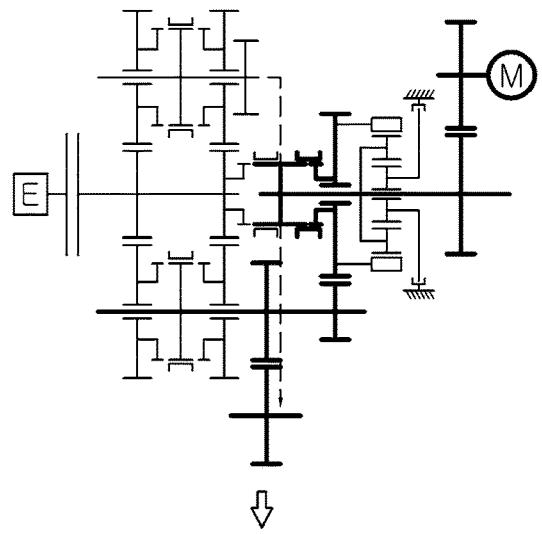
FIG. 7A, FIG. 7B and FIG. 7C are diagrams illustrating a process of shifting from the first speed to the second speed in the powertrain of FIG. 1 in an electric vehicle mode.
Figure 7B:
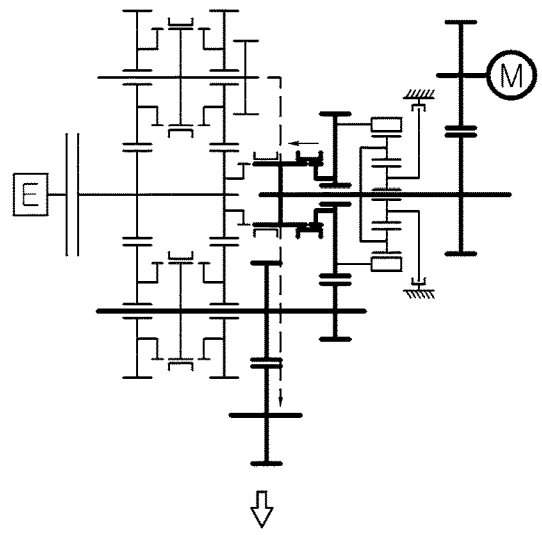
Figure 7C:
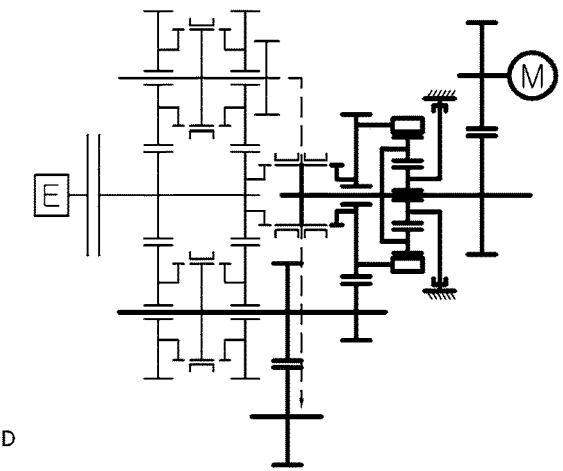

FIG. 7A, FIG. 7B and FIG. 7C are diagrams illustrating a process of shifting from the first speed to the second speed in the powertrain in an electric vehicle mode in which the vehicle is driven using only the motor M. As shown in FIG. 7A, the variable driving gear VD is connected to the motor input shaft MI by the second sleeve SB2 of the composite synchronizer CS, and the motor M is driven under the condition that the brake BK is released, implementing the driving state of the vehicle in the first speed using the motor M. When a command for instructing to shifting to the second speed is given, operating force is applied in advance in a direction of releasing the second sleeve SB2 of the composite synchronizer CS (in the direction of the arrow), as shown in FIG. 7B.

In the state shown in FIG. 7B, the variable driving gear VD is driven by the second sleeve SB2, and when the brake BK is engaged, the speed of the variable driving gear VD is increased to the speed of the second sleeve SB2 or more by the acceleration action of the planetary gear set PG, and in the present process, the second sleeve SB2 is released into the neutral condition by the operating force applied in advance and the speed of the variable driving gear VD is increased, implementing the driving state of the vehicle in the second speed using the motor M, as shown in FIG. 7C.

Figure 8A:
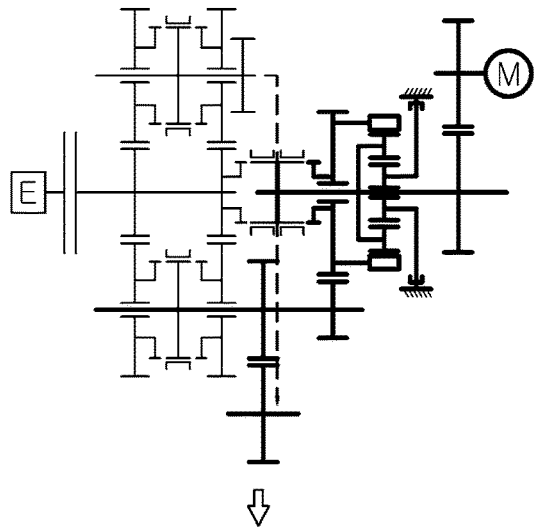
FIG. 8A, FIG. 8B and FIG. 8C are diagrams illustrating a process of shifting from the second speed to the first speed in the powertrain of FIG. 1 in the electric vehicle mode.
Figure 8B:
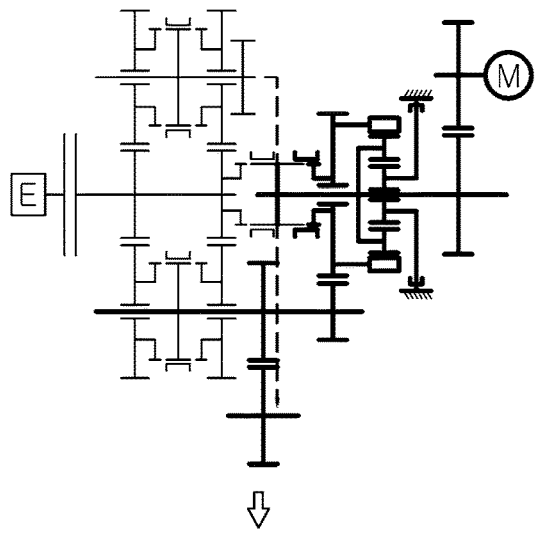
Figure 8C:
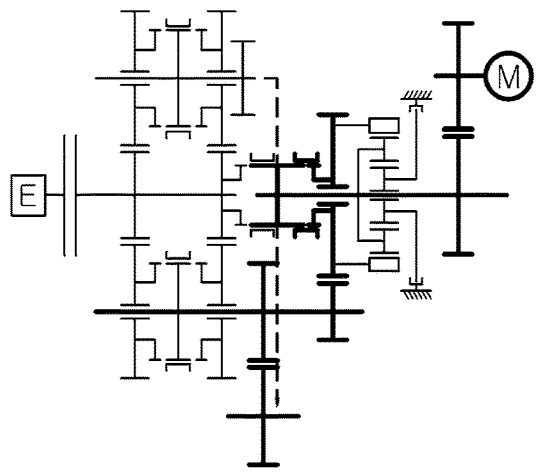

FIG. 8A, FIG. 8B and FIG. 8C are diagrams illustrating a process of shifting from the second speed to the first speed in the powertrain in the electric vehicle mode. When a command for instructing to shifting to the first speed is provided under the driving state of the vehicle in the second speed using the motor M, as shown in FIG. 8A, the variable driving gear VD and the second sleeve SB2 of the composite synchronizer CS are synchronized by control to release the brake BK, and then the second sleeve SB2 is engaged with the clutch gear CG of the variable driving gear VD, as shown in FIG. 8B. Thereafter, when the brake B is completely released, downshifting to the first speed using the motor M is performed, as shown in FIG. 8C.

For reference, when the motor M is rotated in the reverse direction in the instant state, a reverse speed may be easily implemented.

As is apparent from the above description, a hybrid powertrain for vehicles according to an exemplary embodiment of the present invention may improve shift feeling by eliminating torque interruption, which is a disadvantage of an automated manual transmission (AMT), using a motor, while reinforcing the advantages of the Automated Manual Transmission (AMT), and obviate a clutch between the motor and an engine, required by a conventional hybrid powertrain in which the motor is located between the engine and a transmission, to improve ease of mounting of a transmission in a vehicle due to a reduction in the overall length of the transmission, to reduce the weight and production cost of the transmission, and to contribute to improvement in fuel efficiency of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus comprising:
    an engine input shaft selectively connectable to an engine by a main clutch;
    a motor input shaft mounted to be coaxial with the engine input shaft and coupled to a motor;
    a first output shaft and a second output shaft each mounted in parallel to the engine input shaft;
    a variable driving gear rotatably mounted on the motor input shaft to maintain or increase a rotation speed of the motor input shaft and then to transmit the maintained or increased rotation speed to the first output shaft engaged to the variable driving gear;
    a composite synchronizer mounted to independently implement interruption of connection between the engine input shaft and the motor input shaft and interruption of connection between the variable driving gear and the motor input shaft; and
    a plurality of gear pairs mounted to form different transmission gear ratios between the engine input shaft and the first output shaft and between the engine input shaft and the second output shaft,
    wherein a plurality of transmission gear ratios, made by the plurality of gear pairs, and two transmission gear ratios, made when the variable driving gear transmits a power to the first output shaft, forms a series of transmission gear ratios used to drive a vehicle.

2. The powertrain apparatus according to claim 1, wherein the composite synchronizer includes:
    a hub fixed to the motor input shaft; and
    a first sleeve and a second sleeve mounted to be independently slidable on the hub in an axial direction of the motor input shaft.

3. The powertrain apparatus according to claim 2, further including
    a first clutch gear selectively engageable with the second sleeve of the composite synchronizer,
    wherein the first clutch gear is integrally connected to a third rotation element of a planetary gear set via the variable driving gear.

4. The powertrain apparatus according to claim 3, wherein the planetary gear set further includes:
    a first rotation element rotatably mounted to the motor input shaft and selectively connectable to a transmission housing by a brake; and
    a second rotation element fixed to the motor input shaft.

5. The powertrain apparatus according to claim 4, wherein the first rotation element is a sun gear, the second rotation element is a planet carrier, and the third rotation element is a ring gear.

6. The powertrain apparatus according to claim 3,
    wherein the first sleeve of the composite synchronizer forms a synchronization device connectable to the engine input shaft through synchronous interaction using a synchronizer ring due to axial movement of the first sleeve; and
    wherein the second sleeve of the composite synchronizer and the first clutch gear of the variable driving gear form a dog clutch.

7. The powertrain apparatus according to claim 3,
    wherein the plurality of transmission gear ratios includes gear ratios for first, second, third, fourth, fifth and sixth speeds, wherein the plurality of gear pairs includes a first plurality of gear pairs and a second plurality of gear pairs, wherein the first plurality of gear pairs between the engine input shaft and the first output shaft is mounted to implement the gear ratio of the second speed and the gear ratio of the sixth speed;

wherein the second plurality of gear pairs between the engine input shaft and the second output shaft are mounted to implement the gear ratio of the first speed and the gear ratio of the fourth speed; and wherein the variable driving gear is mounted to transmit power to the first output shaft at the gear ratio of the third speed and the gear ratio of the fifth speed.

8. The powertrain apparatus according to claim 7, wherein the first plurality of gear pairs includes a first driving gear, a second driving gear, a first driven gear, and a second driven gear, wherein the second plurality of gear pairs includes the first driving gear, the second driving gear, a third driven gear, and a fourth driven gear, wherein the first driving gear used to implement the gear ratio of the first speed and the gear ratio of the second speed in common and the second driving gear used to implement the gear ratio of the fourth speed and the gear ratio of the sixth speed in common are mounted on the engine input shaft;

wherein the first driven gear for the second speed engaged with the first driving gear and the second driven gear for the sixth speed engaged with the second driving gear are mounted on the first output shaft; and wherein the third driven gear for the first speed engaged with the first driving gear and the fourth driven gear for the fourth speed engaged with the second driving gear are mounted on the second output shaft.

9. The powertrain apparatus according to claim 8, wherein the first driving gear and the second driving gear are fixed to the engine input shaft;

wherein a second and sixth speed synchronization device configured to selectively lock rotation of the first driven gear for the second speed and the second driven gear for the sixth speed onto the first output shaft is mounted on the first output shaft; and wherein a first and fourth speed synchronization device configured to selectively lock rotation of the third driven gear for the first speed and the fourth driven gear for the fourth speed onto the second output shaft is mounted on the second output shaft.

10. The powertrain apparatus according to claim 8, wherein a second clutch gear selectively engaged with the first sleeve of the composite synchronizer is fixed to the second driving gear.

11. The powertrain apparatus according to claim 1, wherein a first output gear is fixed to the first output shaft, wherein a second output gear is fixed to the second output shaft, and wherein the first output gear and the second output gear are in common engaged with a gear of a differential device.

12. The powertrain apparatus according to claim 1, wherein a motor driven gear configured to receive power from the motor is fixed to the motor input shaft, and wherein a motor driving gear mounted on a rotation shaft of the motor is engaged with the motor driven gear.

* * * * *